No. 879,866. PATENTED FEB. 25, 1908.
J. F. GORNDT.
BAKER'S OVEN.
APPLICATION FILED JUNE 28, 1907.
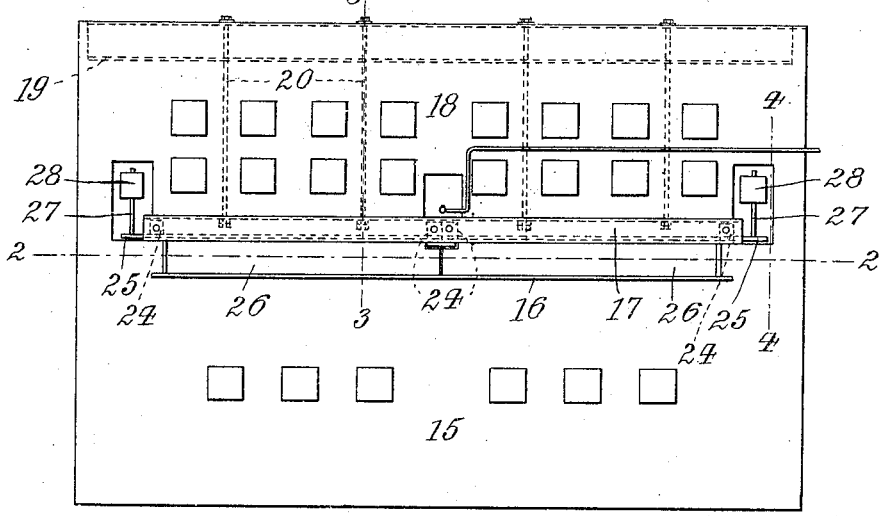
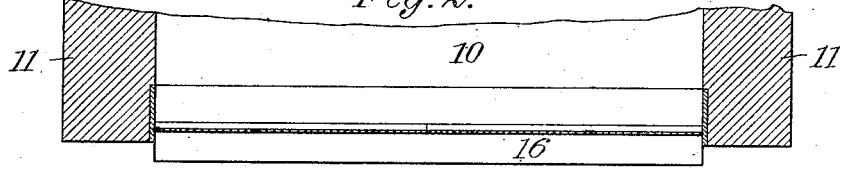
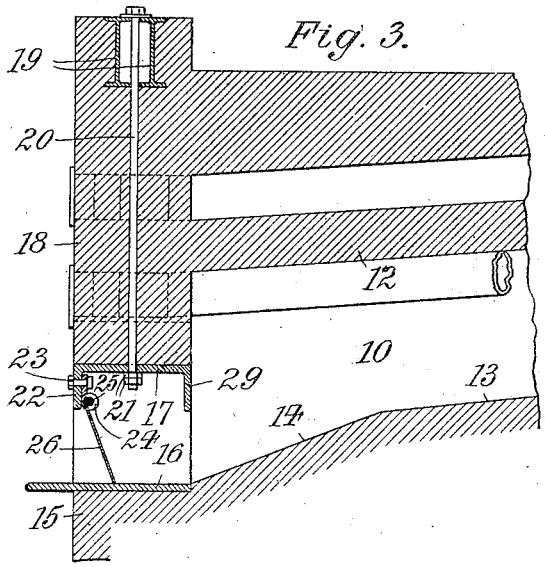
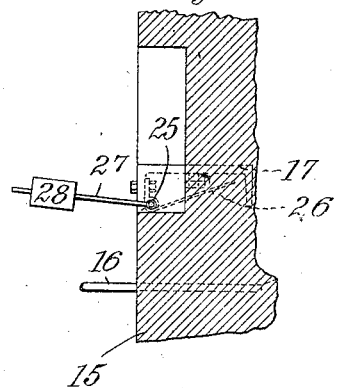
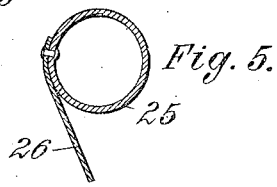
Witnesses:
Arthur E. Zumpe
William Schulz
Inventor
John F. Gorndt,
By his Attorney
THE NORRIS PETERS CO., WASHINGTON, D. C.

UNITED STATES PATENT OFFICE.

JOHN F. GORNDT, OF CHICAGO, ILLINOIS.

BAKER'S OVEN.

No. 879,866.     Specification of Letters Patent.     Patented Feb. 25, 1908.

Application filed June 28, 1907. Serial No. 381,232.

*To all whom it may concern:*

Be it known that I, JOHN F. GORNDT, a citizen of the United States, residing at Chicago, county of Cook, State of Illinois, have invented new and useful Improvements in Bakers' Ovens, of which the following is a specification.

This invention relates to an improved baker's oven and more particularly to an improved construction of the baking chamber whereby access to the same is facilitated and the escape of heat and steam is retarded.

Heretofore the door leading to the baking chamber was made of a width considerably less than the width of said chamber, so that the charging and discharging operation could be but slowly performed and that the distribution of the dough batches upon the sole of the oven was greatly impeded. By my invention these difficulties are overcome by rendering the entire front of the oven accessible, so that the latter may be readily filled and emptied by the baker or by a number of bakers working simultaneously.

In the accompanying drawing: Figure 1 is a front view of a baker's oven embodying my invention; Fig. 2 a horizontal section on line 2—2, Fig. 1, through the front thereof; Fig. 3 a vertical section through the front of the oven on line 3—3, Fig. 1; Fig. 4 a section similar to Fig. 3, on line 4—4, Fig. 1, and Fig. 5 a detail of the door suspending means.

The baking chamber 10 extends between the side walls 11 of the oven and is provided with a roof 12. The sole 13 of the baking chamber has a slight forward slope merging into a more pronounced dip 14 directly back of the front wall of the oven. Upon the lower section 15 of the latter is supported a hearth plate 16 which at its rear end is on a common level with the lower end of dip 14, while its forward end projects some distance beyond wall 15. In lieu of the usual small opening heretofore formed in ovens of this kind, I provide an opening in the front wall above plate 16 which is equal in length substantially to the entire width of baking chamber 10, or in other words, the opening for said baking chamber extends substantially from one of the side walls 11 to the other side wall. This opening is defined at its top by an inverted U-shaped beam or lintel 17, which thus also extends across the entire width of the baking chamber and is supported at its ends on side walls 11. Upon lintel 17 is, in turn, supported the upper section 18 of the front oven wall which projects preferably some distance below the roof 12 of the baking chamber. It will be seen that by the construction described, the entire weight of upper wall section 18 is borne by lintel 17, in contradistinction to the old construction, in which the upper wall section was built directly upon the lower wall section, with the exception of the restricted opening necessary for the door.

To enable lintel 17 to sustain the weight of wall section 18, there are provided a pair of upper parallel beams 19 resting upon side walls 11. From beams 19 depend, at suitable intervals, hangers 20 built into wall section 18 and passing through perforations of lintel 17 to which they are held by nuts 21. To the depending front flange 22 of lintel 17 are secured by bolts 23, the bearings 24 of a pair of independently rotatable rods 25, which are preferably made of gas pipe. To each of these pipes is riveted a folding door 26, each door being adapted to close one half of the baking chamber 10. Doors 26 carry the usual arms 27 bearing counterweights 28 and facilitating the manipulation of the doors. The depending rear flange 29 of lintel 17 forms a vertical extension of upper wall section 18 and constitutes in conjunction therewith a shield for retaining the heat and steam at the top of the oven when the doors are opened.

The drawing shows the oven provided with two doors 26 placed side by side, but it is evident that the number of doors may be increased or that but a single door may be used, the gist of the construction being that the combined length of the several doors or the entire length of a single door is equal substantially to the entire width of the baking chamber. It will be seen that by the construction described, the baking chamber is rendered readily accessible throughout its entire width, so that it may be quickly charged and emptied. In this way the time during which the dough batches are subjected to the baking operation is equalized, so that a uniform output is insured. Further, all obstructions to the mouth of the baking chamber are done away with and all dark and practically inaccessible corners are avoided, while the volume of light thrown into the oven through the open doors is increased. The shield 29 checks the escape of the heat and steam when the doors are opened. The efficiency of this shield is increased by reason of the dip of the baking chamber, because thereby the back of the oven sole is raised gradually above the lower edge of the shield.

I claim:

A baker's oven provided with side walls, a beam supported thereon at its ends and having a depending rear flange and a depending front flange, and a door hinged to the depending front flange, and extending the entire width of the oven substantially as specified.

Signed by me at Chicago, Illinois, this 26th day of June, 1907.

JOHN F. GORNDT.

Witnesses:
 ARTHUR LUNDIN,
 EMIL WEIG.